Patented Feb. 2, 1943

2,309,681

UNITED STATES PATENT OFFICE 2,309,681

BETA-ALKOXYGUANAMINES

Jack Theo Thurston, Cos Cob, and Margaret H. Bradley, Old Greenwich, Conn., assignors to American Cyanamid Company, New York, N. Y., a corporation of Maine No Drawing. Application August 30, 1941, Serial No. 409,133

10 Claims. (Cl. 260—248)

This invention relates to beta-alkoxyguanamines and methods of preparing them.

Beta-alkoxyguanamines having the following formula:

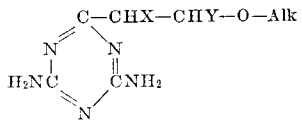

in which Alk represents an alkyl radical and X and Y are members included in the group consisting of H and alkyl, can be prepared by the process of the present invention which involves the reaction of biguanide with esters of beta-alkoxy acids. The products are capable of forming thermosetting resins with formaldehyde, many of which are soluble in water, depending on the size of the alkyl group, and can be used in textile finishes such as crease-proofing compositions and similar purposes where it is desirable to apply the resin in the form of a water dispersion.

Some of the guanamines of the present invention can be prepared by simple reaction of biguanide, preferably dissolved in a suitable solvent such as methanol, with the alkoxy ester. The speed of the reaction varies with different esters and when it is slow it is preferable to use a catalyst such as a metal alkoxide. The present invention is not broadly limited to any particular process of making the guanamines, but we prefer, in general, to react biguanide with the corresponding alkoxy ester.

The reaction is preferably carried out in the presence of a suitable solvent for biguanide, for which purpose alcohols may be used, either lower paraffin alcohols or the ethyl ether of ethylene glycol. Methanol is an excellent solvent for biguanide. It is cheap and operates very satisfactorily in the process. It is therefore the preferred solvent, although the invention is not broadly limited to its use.

The invention will be described in greater detail in conjunction with the following specific examples which represent typical embodiments of the invention, but it should be understood that the invention is in no way limited thereto. The parts are by weight.

Example 1

Beta-ethoxypropionoguanamine

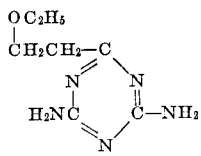

44 parts of ethyl beta-ethoxypropionate were mixed with a solution of 25 parts of biguanide dissolved in 160 parts of methanol. The reaction mixture was allowed to stand overnight at room temperature and crystallization occurred. The product was filtered, recrystallized from water and acetone, and formed fine white crystals, melting at 164–165° C., the yield being about 80%.

Example 2

Beta-amyloxypropionoguanamine

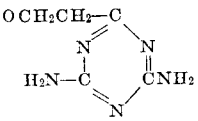

50 parts of amyl beta-amyloxypropionate were added to a solution of 20 parts of biguanide in 130 parts of methanol. The reaction mixture was allowed to stand overnight and the crystals were removed by filtration. The product, which was recrystallized from methanol, methyl acetate and then acetone, was obtained in the form of fine white crystals, melting at 119–120° C. and the yield was slightly under 90%.

Example 3

Beta-oxydipropionoguanamine

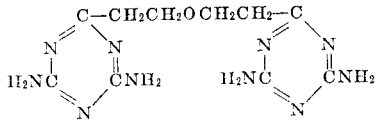

50 parts of diethyl beta-oxydipropionate were added to a solution of 38 parts of biguanide dissolved in 240 parts of methanol. After standing a short time at room temperature crystallization began to take place. When the reaction was completed the product was removed by filtration and recrystallized from water. The yield of fine white crystals melting at 310° C. was just under 75%.

*Example 4*

Beta-ethoxybutyroguanamine

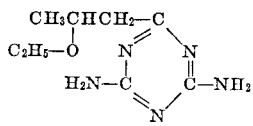

Thirty parts of methyl crotonate were added to 25 parts of biguanide dissolved in 160 parts of ethanol. After standing until crystallization was complete, the product was filtered off and the filtrate concentrated to obtain further product. The crude material was recrystallized from water, ethylacetate and acetone, and the pure product appeared in the form of fine white crystals having a melting point of 197–198° C., the yield being about 50%.

*Example 5*

Beta-methoxyisobutyroguanamine

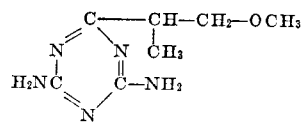

Twenty-five parts of biguanide were dissolved in 160 parts of methanol and 30 parts of methyl methacrylate were added. After standing a few hours a colorless crystalline solid began to precipitate. When crystallization was complete, methacryloguanamine of the following formula:

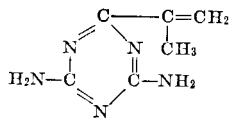

was obtained in a yield of 61%. The filtrate was cooled in ice water and eight parts of β-methoxyisobutyroguanamine melting at 155° C. was obtained. After recrystallization from the following solvents, water, ethyl acetate, ethanol and acetone, and thoroughly drying, the product melted at 166° C.

*Example 6*

Stearoxypropionoguanamine

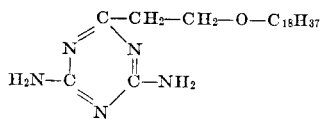

Nine-three parts of ethyl β-stearoxypropionate dissolved in 150 parts of ethanol were added to 26 parts of biguanide dissolved in 150 parts of methanol. The reaction mixture was stirred for several hours in order to aid crystallization of the product, which started separating after about two hours. The β-stearoxypropionoguanamine was filtered from the solvent which in turn was concentrated to yield more product. The combined yield of crude product melting at 104–106° C. was about 86%. After recrystallization from acetone the product melted at 108–110° C.

In the examples methanol and ethanol have been used as solvents, but similar results can be obtained with other alcohols showing satisfactory solubility with biguanide, such as, for example, ethyl ether of ethylene glycol.

We claim:

1. Beta-alkoxyguanamines having the following formula:

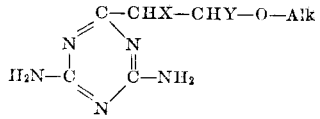

in which Alk is alkyl and X and Y are members included in the group consisting of H and alkyl.

2. Beta-alkoxyguanamines having the following formula:

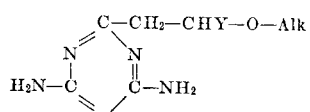

in which Alk is alkyl and Y is a member included in the group consisting of H and alkyl.

3. An alkoxypropionoguanamine having the following formula:

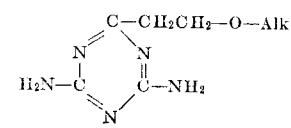

in which Alk is alkyl.

4. Stearoxypropionoguanamine.

5. Beta-amyloxypropionoguanamine having the formula:

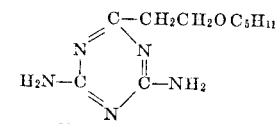

6. A beta-oxydipropionoguanamine.

7. A method of preparing a beta-alkoxyguanamine which comprises reacting biguanide with an ester of a beta-alkoxycarboxylic acid.

8. A method of preparing beta-ethoxypropionoguanamine which comprises reacting an ester of ethoxypropionic acid and biguanide.

9. A method of preparing beta-amyloxypropionoguanamine which comprises reacting an ester of beta-amyloxypropionic acid with biguanide.

10. A method of preparing beta-oxydipropionoguanamine which comprises reacting biguanide with a diester of beta-oxydipropionic acid.

JACK THEO THURSTON.
MARGARET H. BRADLEY.